(12) United States Patent  (10) Patent No.: US 7,928,893 B2
Baraniuk et al.  (45) Date of Patent: Apr. 19, 2011

(54) APPARATUS AND METHOD FOR COMPRESSIVE SENSING RADAR IMAGING

(75) Inventors: Richard G. Baraniuk, Houston, TX (US); Theo P. H. Steeghs, Ilfov (RO)

(73) Assignee: William Marsh Rice University, Houston, TX (US)

( * ) Notice: Subject to any disclaimer, the term of this patent is extended or adjusted under 35 U.S.C. 154(b) by 0 days.

(21) Appl. No.: 12/296,627

(22) PCT Filed: Apr. 12, 2007

(86) PCT No.: PCT/US2007/066573
§ 371 (c)(1),
(2), (4) Date: Aug. 26, 2009

(87) PCT Pub. No.: WO2008/063691
PCT Pub. Date: May 29, 2008

(65) Prior Publication Data
US 2010/0001901 A1  Jan. 7, 2010

Related U.S. Application Data

(60) Provisional application No. 60/791,323, filed on Apr. 12, 2006.

(51) Int. Cl.
*G01S 13/00* (2006.01)

(52) U.S. Cl. ....................................... 342/25 F; 342/179
(58) Field of Classification Search ................. 342/25
See application file for complete search history.

(56) References Cited

U.S. PATENT DOCUMENTS

| 6,552,677 | B2 | 4/2003 | Barnes et al. | |
|---|---|---|---|---|
| 7,339,540 | B2 | 3/2008 | Tietjen | |
| 7,343,232 | B2 | 3/2008 | Duggan et al. | |
| 2002/0175850 | A1* | 11/2002 | Barnes et al. | 342/22 |
| 2005/0195103 | A1* | 9/2005 | Davis et al. | 342/99 |
| 2006/0029279 | A1* | 2/2006 | Donoho | 382/232 |
| 2006/0197698 | A1* | 9/2006 | Woodford et al. | 342/25 R |

* cited by examiner

*Primary Examiner* — Thomas H Tarcza
*Assistant Examiner* — Timothy A Brainard
(74) *Attorney, Agent, or Firm* — 24IP Law Group; Timothy R. DeWitt

(57) ABSTRACT

Method and apparatus for developing radar scene and target profiles based on Compressive Sensing concept. An outgoing radar waveform is transmitted in the direction of a radar target and the radar reflectivity profile is recovered from the received radar wave sequence using a compressible or sparse representation of the radar reflectivity profile in combination with knowledge of the outgoing wave form. In an exemplary embodiment the outgoing waveform is a pseudo noise sequence or a linear FM waveform.

18 Claims, 5 Drawing Sheets

APPARATUS AND METHOD FOR COMPRESSIVE SENSING RADAR IMAGING

CROSS-REFERENCE TO RELATED APPLICATIONS

The present application claims the benefit of the filing date of U.S. Provisional Application Ser. No. 60/791,323, entitled "Compressive Sensing for Radar" and filed on Apr. 12, 2006 by inventors Richard G. Baraniuk and Phillipe Steeghs.

The above cross-referenced related application is hereby incorporated by reference herein in its entirety.

STATEMENT REGARDING FEDERALLY SPONSORED RESEARCH OR DEVELOPMENT

The present invention was developed with funding under the following grants: NSF CCF-0431150; ONR N00014-06-1-0769; and DARPA N66001-06-1-2011.

BACKGROUND OF THE INVENTION

1. Field of the Invention

The invention relates to radar systems and more particularly to development of high resolution radar scene profiles (i) using a lower rate sampling of a radar wave sequence than previous techniques and (ii) eliminating the pulse compression (matched filtering) as a separate signal processing step in the receive signal chain.

2. Brief Description of the Related Art

In High Range Resolution (HRR) radar, Synthetic Aperture Radar (SAR), inverse SAR (ISAR), and similar systems, an electromagnetic pulse is transmitted and received by radar antennas. The wave sequence that is received by the receiving antenna is typically converted into a sampled digital representation for further signal processing in a digital computer. See M. Skolnik, "Radar Handbook", McGraw-Hill, 1970; F. Le Chavalier, "Principles of Radar and Sonar Signal Processing", 2002; and N. Levanon and E. Mozeson, "Radar Signals", 2004. The analog-to-digital (A/D) conversion takes place either before or after pulse compression. In most modern SAR radar systems, pulse compression takes place after A/D conversion in the computer.

Pulse compression (see M. H. Carpentier, "Pulse Compression and equivalent technologies", in: *Advanced Radar Techniques and Systems, ed. G. Galati, IEE radar, sonar, navigation and avionics series* 4, IEE, 1993) is required in order to generate a radar signal that provides a high resolution image of the target that is being probed. In order to obtain an adequate signal back from the target, i.e., to obtain the desired resolution, a short duration pulse is desired. However, short duration pulses are very difficult to implement due to their high power, and therefore another method, known as pulse compression, is used. In pulse compression radar systems on transmit a long pulse with some phase or frequency modulation is generated. On receive the echo wave sequence is correlated with the modulation of the emitted signal, resulting in accurate ranging. The process of correlating an unknown signal with a known signal or a template thereof to detect the presence of the known signal or template is known as matched filtering. Matched filtering for radar pulse compression is equivalent to convolving the received wave sequence with a time-reversed replica of the transmitted radar wave form. The key property of the transmitted radar waveform, be it a chirp or PN sequence, is that its autocorrelation (convolution with a time-reversed version of itself) is close to a Dirac delta pulse that is precisely localized in time.

Often a linear FM chirp signal signal is used, other possibilities include binary phase coded waveforms such as Barker codes and pseudorandom or pseudonoise (PN) sequences. See M. Skolnik, "Radar Handbook", McGraw-Hill, 1970.

In order to perform adequate A/D conversion of a short duration pulse (which is equivalent to a wideband transmitted chirp signal) high sampling rate A/D converters with large dynamic range must be used. Thus, currently available A/D converter technologies impose a limitation on the resolution of radar systems, because of limitations in the capacity to sample very wideband signals with sufficiently large dynamic range.

SUMMARY OF THE INVENTION

In a preferred embodiment, the present invention is a method for recovering a radar reflectivity profile comprising the steps of generating an outgoing wave sequence and recovering the radar reflectivity profile utilizing knowledge of said outgoing wave sequence in combination with a compressible or sparse representation of the radar reflectivity profile.

The radar reflectivity profile may be recovered from a below Nyquist-rate (the Nyquist rate is defined as two times the frequency bandwidth of the data) sampled received wave sequence. A part of the radar profile may be reconstructed using a subset of the coefficients associated with a full recovery of the radar scene. The method recovering step may comprise performing a detection or Automatic Target Recognition task on the received wave sequence utilizing a compressible representation of the radar scene in combination with knowledge of the outgoing wave sequence.

The step of recovering a radar profile may comprise the step of recovering a range-Doppler radar profile, utilizing a compressible representation of the radar scene in combination with knowledge of the outgoing wave sequence, and additional radar acquisition parameters. The additional radar acquisition parameters may comprise at least one of relative radar position, radar look direction, and Pulse Repetition frequency. The recovering step may recover a two-dimensional Synthetic Aperture Radar (SAR) scene, utilizing a compressible representation of the radar scene in combination with knowledge of the outgoing wave sequence and additional SAR acquisition parameters, such as relative radar position, radar look direction and Pulse Repetition Frequency. Further, the recovering step may recover a two-dimensional Inverse Synthetic Aperture Radar (ISAR) target profile, utilizing a compressible representation of the radar target reflectivity, in combination with knowledge about the outgoing wave sequence and additional ISAR acquisition parameters, such as target position, radar look direction and Pulse Repetition Frequency. The radar profile may be developed in three dimensions.

Still other aspects, features, and advantages of the present invention are readily apparent from the following detailed description, simply by illustrating a preferable embodiment and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention.

BRIEF DESCRIPTION OF THE DRAWINGS

For a more complete understanding of the present invention and the advantages thereof, reference is now made to the following description and the accompanying drawings, in which.

DETAILED DESCRIPTION OF THE PREFERRED EMBODIMENTS

Figure 1:
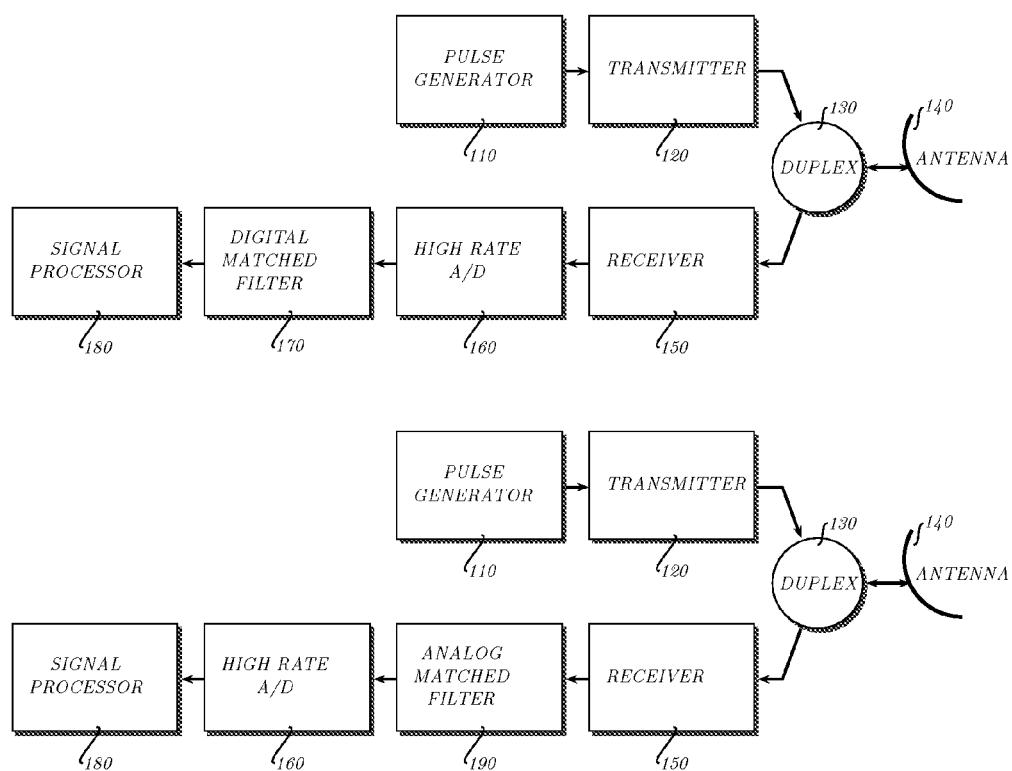
FIG. 1 is a block diagram of a conventional High Range Resolution radar system.

FIG. 1 is a conceptual diagram of a High Range Resolution (HRR) radar system. Transmission of a radar signal includes generation of a radar waveform in a pulse generator 110 and an RF transmitter 120. Additionally, a receive signal path includes an RF receiver 150 and a analog-to-digital (A/D) converter 160. A typical high range resolution radar system transmits a wideband pulse (linear chirp, stepped frequency, pseudonoise sequence, and so on) and then correlates the received signal with a replica of that same pulse in a matched filter. This matched filter operation effects in pulse compression in the received wave sequence. The pulse compression is either performed in an analog pulse compression unit 190 or after the A/D conversion in a digital computer 170. The thus pulse compressed radar signal is then processed in a digital computer 180 to develop a one-dimensional HRR radar scene profile or a two-dimensional synthetic aperture radar (SAR) image signal processor. Both the transmit and receive signal paths are coupled through a duplexer 130 to an antenna 140. The duplexer isolates the receive signal processing path from the antenna during signal transmission and vice versa. Alternatively, separate antennae may be used to transmit and receive radar signals.

In order to perform adequate A/D conversion of a wideband radar wave sequence a high sampling rate A/D converter with high dynamic range is required. The performance of the currently available A/D converter devices impose limits on the resolution of radar systems, because of limitations in their capacity to sample very wideband signals with the desired dynamic range.

Figure 2:
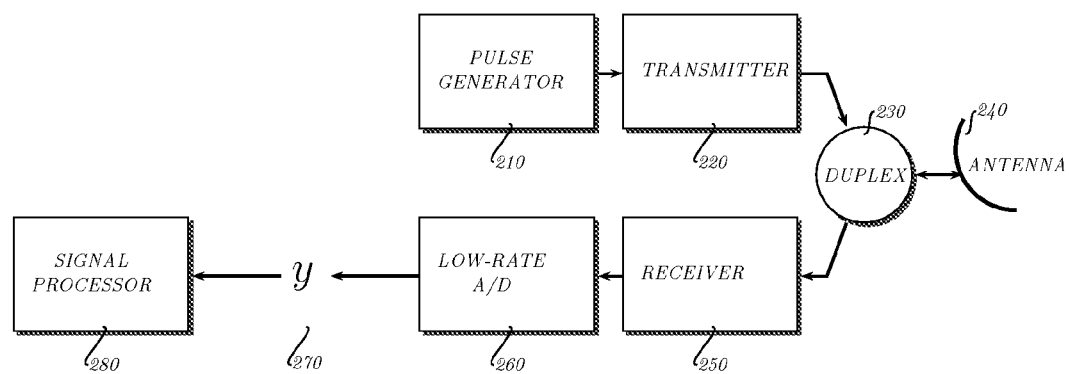
FIG. 2 is a block diagram of an example system that obtains compressive measurements of a received radar wave sequence and then processes the data to develop the radar scene profile or solve a radar detection or recognition problem.

In a first preferred embodiment, a radar system architecture utilizes the concept of Compressive Sensing, which is also known in the literature as Compressed Sensing, detailed below, to reduce the required receiver A/D conversion bandwidth and eliminate the need for the matched filter in the radar receiver signal path. FIG. 2 is a conceptual diagram of a radar system that acquires a received radar wave sequence according to the teachings of the present invention. The radar signal transmit path equals that of a conventional radar system with a pulse generator 210 and an RF transmitter 220. The duplexer 230 isolates the receive signal processing chain from the antenna 240 during transmission and vice versa. Alternatively, separate transmit and receive antennae may be used.

Mathematically the radar receive wave sequence corresponds to a convolution of the transmitted pulse and a radar scene reflectivity function. For a radar scene model the system assumes sparsity or compressibility; that is, that there exists some basis, frame, or dictionary in which the radar scene has a concise representation. For construction of the radar scene profile the method uses the above model of a convolution of a radar pulse with a sparse/compressible radar target reflectivity and some recovery algorithm (based on optimization, greedy, iterative, or other algorithms) to find the sparsest or most compressible or most likely scene profile that explains the measured receive wave sequence.

The utilization of the concept of Compressive Sensing results in a different receive signal path than that of a conventional radar. The receiver 250 of the Compressive Sensing based radar system can be the same as a receiver that is used in a conventional system. The A/D converter 260 in the Compressive Sensing system can operate at a lower sampling rate than would be required for conventional radar system. The thus obtained radar signal 270 is directly fed into a digital computer 280, where the radar profile is developed using the algorithms for radar Compressive Sensing, eliminating the need for the separate pulse compression step.

Compressive Sensing

A new framework for simultaneous sensing and compression has developed recently under the rubric of Compressive Sensing. Donoho and, independently, Candés, Romberg, and Tao have put forth this framework in the following series of papers:

D. Donoho, "Compressed sensing", *IEEE Trans. Information Theory*, Vol. 25, No 4, April 2006, pages 1289-1306;

E. Candés, J. Romberg, and T. Tao, "Robust uncertainty principles: Exact signal reconstruction from highly incomplete frequency information", *IEEE Trans. Information Theory*, Vol. 52, No 2, February 2006, pages 489-509;

E. Candés and T. Tao, "Decoding by linear programming", IEEE Trans. Information Theory, Vol. 512, No 12, pages 4203-4215, 2005; and E. Candés, J. Romberg, and T. Tao, "Stable signal recovery from incomplete and inaccurate measurements", *Communications on Pure and Applied Mathematics*, Vol. 59, No. 8, pages 1207-1223, 2006.

Compressive Sensing builds upon as core tenet of signal processing and information theory: that signals, image, and other data often contain some type of structure that enables intelligent representation and processing. Current state-of-the-art compression algorithms employ a decorrelating transform to compact a correlated signal's energy into just a few essential coefficients. Such transform coders exploit the fact that many signals have a sparse representation in terms of some basis $\Psi$, meaning that a small number of K adaptively chosen transform coefficients can be transmitted or stored rather than x signal samples, where K<N. Mathematically we wish to acquire a length-N discrete-time signal x of any dimension indexed as $x(n)$, $n=1, \ldots, N$, for which a basis or (tight) frame $\Psi = [\Psi_1, \ldots, \Psi_N]$ (see S. Mallat, "A Wavelet Tour of Signal Processing". Academic Press, 1999) provides a K-sparse representation $$x = \sum_{i=1}^{N} \theta_i \psi_i = \sum_{l=1}^{K} \theta(i_l)\psi_{i_\ell}, \quad (1)$$

where x is a linear combination of K basis vectors chosen from $\{\psi_i\}$, $\{i_l\}$ are the indices of those vectors, and $\{\theta_i\}$ are the weighting coefficients. Alternatively, by stacking the basis vectors as columns into the N×N sparsity basis matrix $\Psi=[\psi_1 | \ldots | \psi_N]$, we can write in matrix notation $$x = \Psi\theta, \quad (2)$$

where θ is an N×1 column vector with K nonzero elements. Various expansions, including wavelets, the DCT, and Gabor frames, are widely used for the representation and compression of natural signals, images, and other data.

The terms "signal", "image", "profile", and "scene" are used interchangeably here, since an image is a two-dimensional (2D) signal and a "radar profile" or "radar scene" which is a signal or an image of a measurement of the intensity of a radar return.

Let $\|\cdot\|_p$ denote the $l_p$ norm. Let $\|\theta\|_0$ denote that $l_0$ norm that counts the number of nonzero entries in the vector θ. The signal x is compressible if the sorted magnitudes of the coefficients $\{|\theta_i|\}$ decay rapidly to zero; this is the case, for example, if $\theta \in l_p$ for $p \leq 1$. Compressible signals are well-approximated by sparse signals.

The standard procedure for transform coding, is to (i) acquire the full N-point signal x via Nyquist-rate sampling; (ii) compute the complete set of transform coefficients $\{\theta_i\}$; (iii) locate the K largest, significant coefficients and discard the (many) small coefficients; (iv) encode the values and locations of the largest coefficients.

This procedure has three inherent inefficiencies: First, for a wideband signal, we must start with a large number of Nyquist-rate samples N. Second, the encoder must compute all of the N transform coefficients $\{\theta_i\}$, even though it will discard all but K of them. Third, the encoder must encode the locations of the large coefficients since the locations change with each signal.

In Compressive Sensing, we do not measure or encode the K significant $\theta_i$ directly. Rather, we measure and encode M<N projections $y(m)=\langle x,\phi_m^T\rangle$ of the signal onto a second set of vectors $\{\phi_m\}$, m=1, . . . , M, where $\phi_m^T$ denotes the transpose of $\phi_m$ and $\langle \cdot, \cdot \rangle$ denotes the inner product. In matrix notation, we measure $$y = \Phi x, \quad (3)$$

where y is an M×1 column vector and the measurement matrix Φ is M×N with each row a measurement vector $\phi_m^T$.

Since M<N, recovery of the signal x from the measurements y is ill-posed in general. However, the Compressive Sensing theory tells us that when certain conditions hold, namely that the rows of Φ do not provide a sparse representation of the columns of Ψ (a condition known as incoherence), then it is indeed possible to recover the K largest $\theta_i$'s from a similarly sized set of M=O(K log(N/K)) measurements y. This incoherence property corresponds to a kind of generalized uncertainty principle and holds for many pairs of bases, including for example, Dirac delta function spikes and Fourier sinusoids, or sinusoids and wavelets.

In this case, the signal can be recovered by solving an $l_1$ minimization problem $$\hat{\theta}=\arg\min \|\theta\|_1 \text{ such that } y=\Phi\Psi\theta. \quad (4)$$

This optimization problem, also known as Basis Pursuit (see S. Chen, D. Donoho, and M. Saunders, "Atomic decomposition by basis pursuit", *SIAM Journal on Scientific Computing*, Vol. 20, No. 1, pages 33-61, 1998), can be solved with traditional linear programming techniques. Iterative greedy algorithms such as Matching Pursuit and Orthogonal Matching Pursuit (OMP) (see J. Tropp and A. C. Gilbert, "Signal recovery from partial information via orthogonal matching pursuit", Preprint, April 2005) can recover the signal x from the measurements y. Indeed, there is a growing literature of theory and algorithms for recovering sparse signals from incoherent measurements. The same Compressive Sensing framework of incoherent measurements and optimization-based reconstruction also applies to recovering a close approximation to a compressible signal.

One choice for the measurement matrix Φ is a (pseudo) random, noise-like matrix. For example, we may select its M N entries as iid Gaussian or Bernoulli random variables. It can be shown that many random measurement matrices are universal in the sense that they are incoherent with any fixed basis (spikes, sinusoids, wavelets, Gabor functions, curvelets, and so on) with high probability (see E. Candés, J. Romberg, and T. Tao, "Robust uncertainty principles: Exact signal reconstruction from highly incomplete frequency information", *IEEE Trans. Information Theory*, Vol. 52, No 2, February 2006, pages 489-509; D. Donoho, "Compressed sensing", *IEEE Trans. Information Theory*, Vol. 25, No 4, April 2006, pages 1289-1306; R. G. Baraniuk, M. Davenport, R. A. Devore, and M. B. Wakin, "A simplified proof of the restricted isometry property for random matrices (aka the Johnson-Lindenstrauss lemma meets compressed sensing)", *Constructive Approximation*, 2007). We note that it is critical that the measurement matrix Φ be known to both the encoder and decoder, so in practice it is sufficient to use a pair of pseudo-random number generators at both the encoder and decoder with a common seed known to both.

Another choice for the measurement matrix Φ that offers good performance in many cases is a causal, quasi-Toeplitz matrix where each row is an $\lfloor N/M \rfloor$—place right-shift of the row immediately above it; that is, $\phi_{m,n}=p(\lfloor N/M \rfloor m-n)$ for some vector p. In this case, $y=\Phi x$ can be implemented in a streaming fashion as a linear time-invariant filter followed by decimation by $D=\lfloor N/M \rfloor$ (see J. Tropp, M. Wakin, M. Duarte, D. Baron, and R. G. Baraniuk, "Random filters for compressive sampling and reconstruction", *Proc. ICASSP* 2006, Vol. 3, 2006)

$$y(m) = \sum_{n=1}^{N} p(Dm-n)x(n) \quad (5)$$

for m=1, . . . M. When p is a PN sequence, we dub this approach random filtering.

While we have framed the discussion above on acquiring discrete-time signals x, the Compressive Sensing concept also applies to analog signals x(t) that can be represented sparsely using just K out of N possible elements from some continuous basis or dictionary $\{\psi_i(t)\}_{i=1}^{N}$ as in $$x(t) = \sum_{i=1}^{N} \theta_i \psi_i(t) \quad (6)$$

with only K nonzero $\theta_i$. Alternatively, we can represent x(t) locally using (6) on a sequence of sliding time intervals.

While each $\psi_i(t)$ may have large bandwidth (and hence a high Nyquist rate), the signal x(t) has only K degrees of freedom per interval, and we can apply the discrete Compressive Sensing theory described above to measure it at a rate below Nyquist. Just as in the discrete Compressive Sensing framework above, we can express the overall measurement process in terms of an M×N matrix; however, now the matrix is defined in terms of two more general operators. The M×N matrix is defined as the operator product $\Phi'\Psi'$ that combines two operators: the signal synthesis operator $\Psi'$ that maps the discrete coefficient vector $\theta$ to the analog signal x(t) (as in (6)) above and a signal measurement operator $\Phi'$ that maps the analog signal x(t) to a discrete set of measurements y. Examples of practical $\Phi'$ are given in S. Kirolos, J. Laska, M. Wakin, M. Duarte, D. Baron, T. Ragheb, Y. Massoud, R. G. Baraniuk, "Analog— to—Information Conversion via Random Demodulation," IEEE Dallas Circuits and Systems Workshop, October 2006.

Compressive Sensing Radar Imaging

In order to illustrate our Compressive Sensing based radar concept, consider a simplified one-dimensional range imaging model of a target described by u(r) with range variable r. If we let the transmitted radar pulse $s_T(t)$ interact with the target by means of a linear convolution (see M. Skolnik, "Radar Handbook", McGraw-Hill, 1970), then the received radar signal sR(t) is given by $$s_R(t) = A\int_{\tau \in R} s_T(t-\tau)u(\tau)d\tau, \quad (7)$$

where we have converted the range variable r to time t using $$t = \frac{2r}{c},$$

with c the propagation velocity of light, and where A represents attenuation due to propagation and reflection. If the transmitted signal has the property that $s_T(t)*s_T(-t) \approx \delta(t)$, where $\delta(t)$ is a Dirac delta function, then a band-limited measurement of the radar reflectivity u(t) can be obtained by pulse compression, that is, by correlating $s_R(t)$ with $s_T(t)$ in a matched filter. A/D conversion occurs either before or after the matched filtering, resulting in N Nyquist-rate samples.

The present invention is based on two key observations. First, the target reflectivity functions u(t) that we wish to obtain through the radar process are often sparse or compressible in some basis. For example, a set of K point targets corresponds to a sparse sum of delta functions as in $u(t) = \sum_{i=1}^{K} a_i \delta(t-\kappa_i)$; smooth targets are sparse in the Fourier or wavelet domain; and range-Doppler reflectivities are often sparse in the joint time-frequency (or ambiguity) domain (see M. Skolnik, "Radar Handbook", McGraw-Hill, 1970). Such target reflectivity functions u(t) are good candidates for acquisition via Compressive Sensing techniques.

Second, time-translated and frequency-modulated versions of the PN or chirp signals transmitted as radar waveforms $s_T(t)$ form a dictionary (the extension of a basis or frame) that is incoherent with the time, frequency, and time-frequency bases that sparsify or compress the above mentioned classes of target reflectivity functions u(t) (see J. Tropp, M. Wakin, M. Duarte, D. Baron, and R. G. Baraniuk, "Random filters for compressive sampling and reconstruction", Proc. ICASSP 2006, Vol. 3, 2006). This means that PN or chirp signals are good candidates for the rows of a Compressive Sensing acquisition matrix $\Phi$ as a "random filter".

The combination of these observations results in a radar receiver signal path that has no (digital or analog) matched filter and requires a lower receiver A/D converter bandwidth to obtain the same resolution as a conventional radar system.

Referring again to FIG. 2 our new design for a radar system consists of the following components. The transmit signal chain is the same as in a classical radar; the antenna 240 emits a PN or chirp signal $s_T(t)$. However, the receiver does not consist of a matched filter and high-rate A/D converter but rather only a low-rate A/D converter 260 that operates not at the Nyquist rate but at a rate proportional to the target reflectivity's compressibility.

We make the connection explicit for a PN-based Compressive Sensing radar with a simple sampling model. Consider a target reflectivity generated from N Nyquist-rate samples x(n) via $u(t)=x(\lceil t/\Delta \rceil)$, n=1, ... N, on the time interval of interest $0 \leq t < N\Delta$. The radar transmits a PN signal generated from a length-N random Bernoulli ±1 vector p(n) via $s_T(t)=p(\lceil t/\Delta \rceil)$. The received radar signal $s_R(t)$ is given by (7); we sample it not every $\Delta$ seconds but rather every $D\Delta$ seconds, where $D=\lfloor N/M \rfloor$ and M<N, to obtain the M samples, m=1, ..., M, $$y(m) = s_R(t)|_{t=mD\Delta} \quad (8)$$

$$= A\int_0^{N\Delta} s_T(mD\Delta - \tau)u(\tau)d\tau$$

$$= A\sum_{n=1}^{N} p(mD-n)\int_{(n-1)T}^{nT} u(\tau)d\tau$$

$$= A\sum_{n=1}^{N} p(mD-n)x(n),$$

which are precisely a scaled version of the transmitted pulses. This PN sequence radar implements a random filter in the sense of J. Tropp, M. Wakin, M. Duarte, D. Baron, and R. G. Baraniuk, "Random filters for compressive sampling and reconstruction", Proc. ICASSP 2006, Vol. 3, 2006), and hence the low-rate samples y contain sufficient information to reconstruct the signal x that consists of the Nyquist-rate samples of the reflectivity u(t) via linear programming or a greedy algorithm. Chirp pulses yield similar results.

In Synthetic Aperture Radar (SAR) and Inverse SAR (ISAR) imaging a sequence of radar range profiles is combined in order to obtain a two-dimensional image of an object. See D. R. Wehner, "High Resolution Radar", Artech House Publishers, Boston, 1994. In SAR imaging the radar beam is directed perpendicular to the direction of movement of the airplane or satellite on which the radar is mounted. In this way the movement of the radar is used to increase the imaging aperture of the radar in the direction that is perpendicular to the radar range. Besides this basic stripmap SAR mode there are several other SAR imaging modes, the most prominent ones are spotlight imaging—where the radar beam is directed towards the target—and SAR interferometry. In ISAR imaging the radar is usually in a fixed position and the synthetic aperture is created by the movement of the target that is probed with the radar. The imaging geometry determines how the range profiles should be combined in order to obtain a two-dimensional image of a target. In general, cross-rang resolution is achieved by some type of coherent summation of the radar range profiles. In both SAR and ISAR imaging the movement of the radar platform and/or target needs to be compensated for. Next, a Fourier transformation along the cross-range coordinate results in range-Doppler representation of the radar data. In modern SAR systems also more advanced processing is applied, such as autofocussing for motion compensation.

In two-dimensional radar imaging using the range-Doppler representation for the radar data the ideas of Compressive Sensing and random filtering can also be applied to a achieve a more efficient radar data acquisition system. Efficiencies can be made because with a Compressive Sensing based system fewer range profiles need to be combined to achieve similar cross-range resolution that for the standard approach. We can combine the Compressive Sensing sampling for single pulse radar recordings with Compressive Sensing techniques for combining the one-dimensional recordings into a two-dimensional range-Doppler profile. In this way the efficiency and performance of the radar imaging system will be increased significantly, since the relative gains that are achieved in each of dimensions can be multiplied when estimating the efficiency for the overall imaging system.

Our method of recovering a radar profile utilizing the techniques of Compressive Sensing is also appropriate for monostatic, bistatic, and multistatic (many receivers and transmitters) scenarios. In particular, since the radar receiver is greatly simplified, this can be a framework for multistatic sensor network radars, where the radar signals resulting from one transmitting antenna are received at potentially many receiving antennas, that by virtue of our simplifications, can be made very inexpensively.

Our method can also be combined with the theory of distributed compressed sensing (DCS) (see D. Baron, M. B. Wakin, M. F. Duarte, S. Sarvotham, and R. G. Baraniuk, "Distributed Compressed Sensing", preprint, 2005) for array processing and beamforming type applications involving multiple radar receivers.

Information Scalability

Thanks to the information scalability of Compressive Sensing (see M. Davenport, M. Duarte, M. Wakin, D. Takhar, K. K. Kelly, and R. G. Baraniuk, "The smashed filter for compressive classification and target recognition", in *Proc. IS&T/SPIE Symposium on Electronic Imaging: Computational Imaging*, January 2007), our Compressive Sensing method applies also in situations where we do not need a full reconstruction of the received radar wave sequence, but we would rather perform a detection or classification on the received signals.

While we have focused above almost exclusively on problems in signal reconstruction, approximation, and estimation, the Compressive Sensing framework is scalable to a much wider range of statistical inference tasks. Such tasks, such as detection, do not require a reconstruction of the signal, but only require estimates of the relevant sufficient statistic for the problem at hand. A key finding is that it is possible to directly extract these statistics from a small number of random projections without ever reconstructing the signal. The two upshots are that (i) significantly fewer measurements are required for signal detection than for signal reconstruction and (ii) the computational complexity of detection is much reduced compared to reconstruction. Both of these are of great importance for radar applications, since if we are merely interested in detecting targets rather than reconstructing images of them, then we can use an even lower sampling rate for the A/D.

In many radar applications, target detection, classification, and recognition decisions are often made based on the result of some kind of matched filtering or correlation with a set of templates. Information scalability allows us to compute close approximations to these matched filter results directly from the incoherent projections, without having to perform expensive reconstruction or approximation computations.

EXAMPLES

Example 1

Range Profile Acquisition

Figure 3:
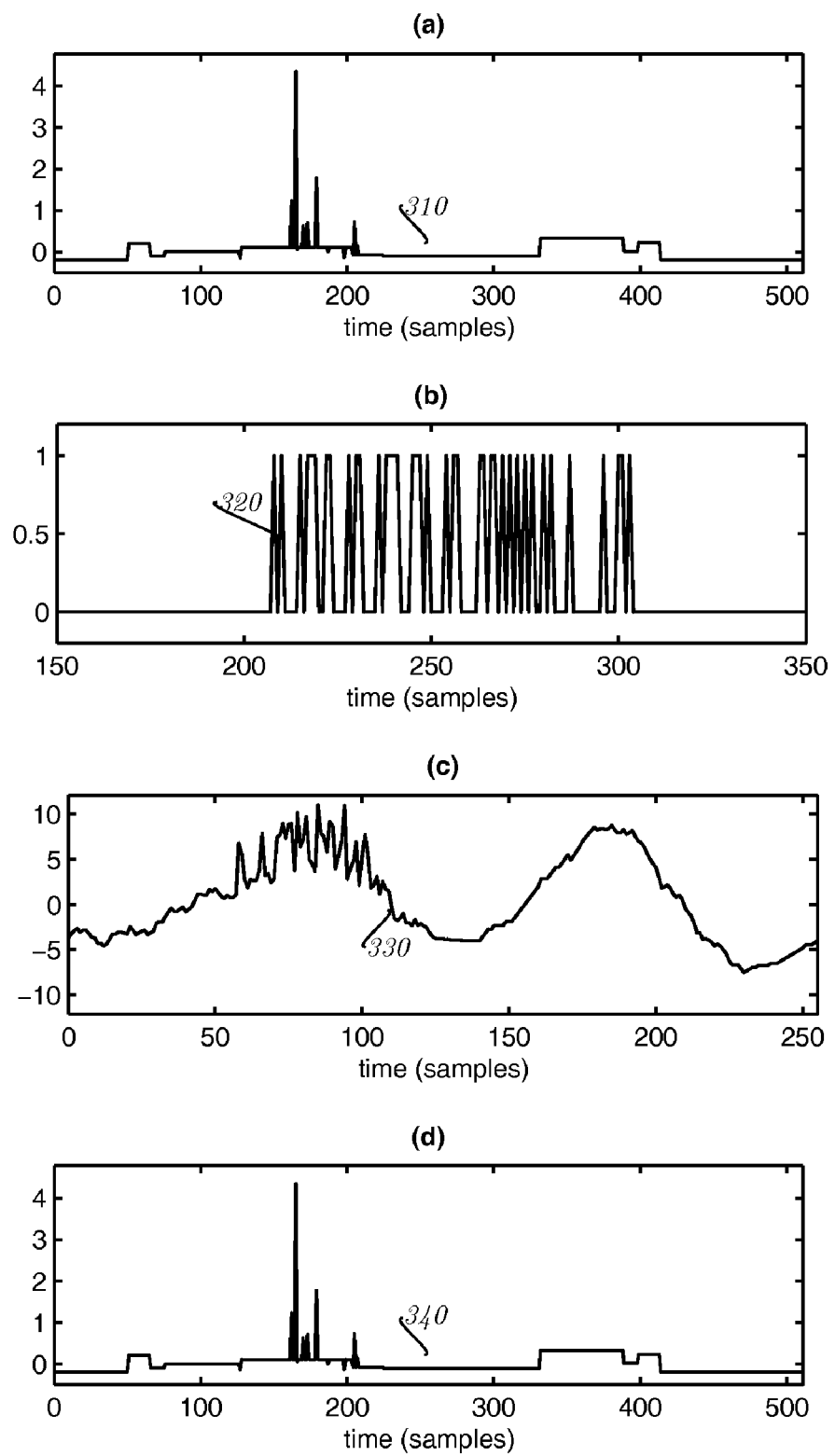
FIG. 3 is a diagram showing the results of a simulation of a one-dimensional radar scene acquisition with a compressive sensing radar receiver.

In a first example we illustrate our method with a simulation of radar range profile acquisition. A radar reflectivity profile 310 is shown in FIG. 3*a*. The reflectivity profile consists of a blocky background signal and a few strong point scatterers. We convolve this reflectivity sequence with a transmitted radar PN wave sequence $s_T(t)$ 320 and obtain a received wave sequence y 330 (see FIG. 2, 270). Following the analysis of the radar reflection process that was given above, this signal interacts with the target reflectivity in the form of a convolution; thus the signal arriving at the receive antenna is of the form $s_R(t)=s_T(t)*u(t)$ (this is the same as a classical radar system; we use "*" to denote convolution). Now we observe that if we eliminate the matched filter (convolution with $s_T(t)$) after the receive antenna, then we can regard the non-matched-filtered received signal $s_R(t)$ $s_T(t)*u(t)$ as a "random filtered" version of the desired signal u(t). Thus, if we merely sample the received signal $s_R(t)$ then the resulting samples $y[n]=s_R(Dt)$ contain sufficient information for CS techniques to reconstruct a sparse representation of u(t). Importantly, the required sampling rate at the receiver will be related to the rate of innovation in u(t) and not its Nyquist rate.

We use an Orthogonal Matching Pursuit (see J. Tropp and A. C. Gilbert, "Signal recovery from partial information via orthogonal matching pursuit", Preprint, April 2005) to solve the signal recovery problem for the reflectivity profile x with $y=\Phi x$ and a sparsity matrix $\Psi$ that is a combination of time-sparse (identity) and Haar wavelet basis. The measurement matrix $\Phi$ is constructed by forming an N column matrix of M rows, where each row is a reversed version of the transmitted PN sequence 320, shifted by D N/M samples with respect to the row above. In the simulation we use a transitted wave sequence of length 100 samples and M=256 samples to recover a N=512 length reflectivity profile. The recovery of the reflectivity profile 340 is exact (FIG. 3*d*).

Thresholded Signal Recovery for Radar Range Profiling

Figure 4:
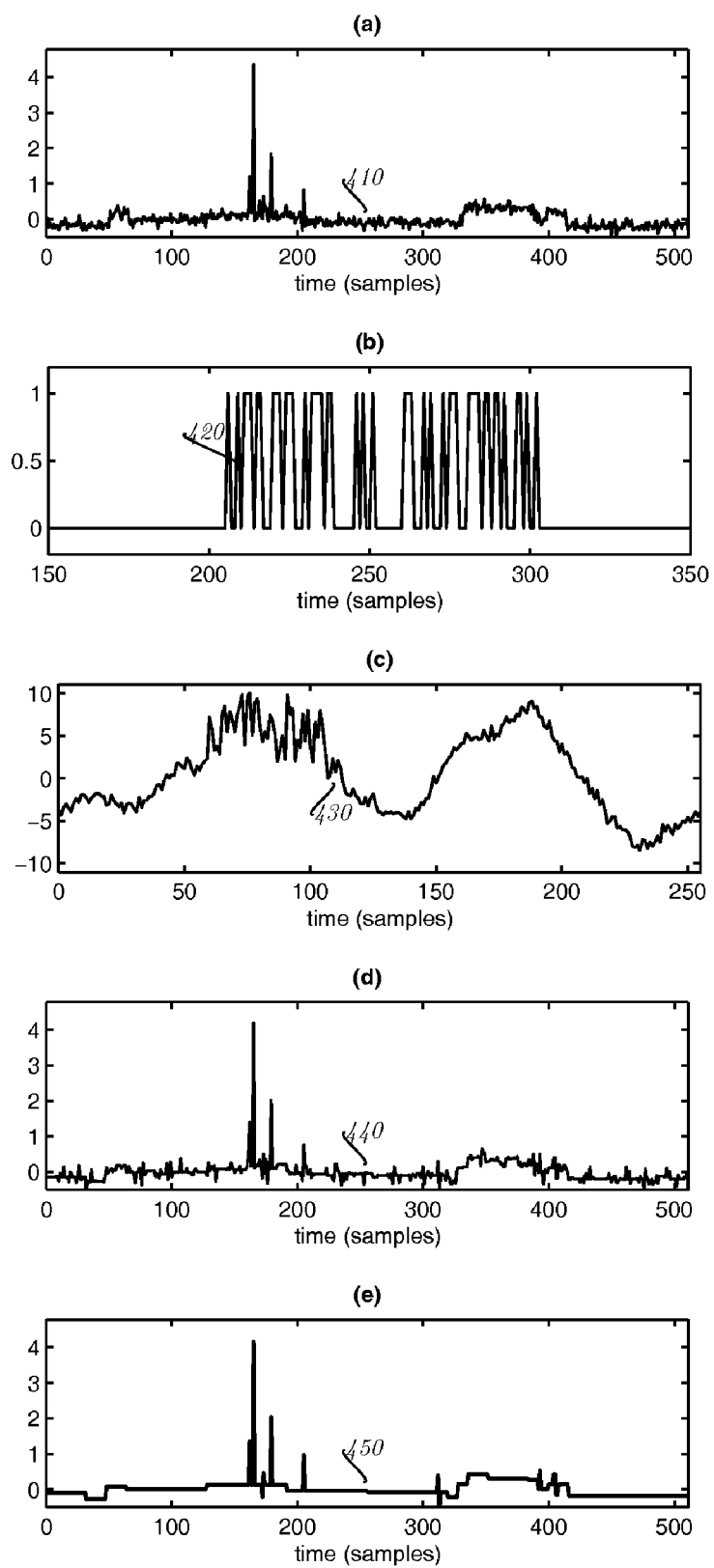
FIG. 4 is a diagram showing the result of a simulation of a one-dimensional radar scene acquisition using a thresholded recovery of radar scene profile.

In this example we illustrate a situation where exact recovery of the radar reflectivity is not required, but we aim to recover some of the salient characteristics of the reflectivity profile. FIG. 4 shows the results of a simulation of HRR profiling with our method adapted for thresholded signal recovery. We simulate a reflectivity profile that is consists of a blocky background with some added small scale random fluctuations plus a few strong point scatterers 410. The radar reflectivity is probed with a PN wave sequence 420. We simulate the received radar signal by convolution of the PN wave sequence 420 with the simulated reflectivity 410. FIG. 4*c* shows the received signal y 430 of M samples. We use the Orthogonal Matching Pursuit algorithm to recover a length N=512 sample reflectivity profile from a length M=256 received signal y. The sparsity basis Ψ that is used is a combination of the an identity and Haar wavelet basis. Because the reflectivity profile 410 contains small scale fluctuations over its entire length is not sparse in Ψ. The recovered signal 440 (FIG. 4d) is not a good approximation of the actual radar reflectivity profile. However, if we use only the largest coefficients for the signal recovery, the resulting recovered signal 450 can be compressed further into a closer approximation of the reflectivity profile 410. At the same time we suppress the small scale fluctuations of the reflectivity that may not be of interest or even undesired for further processing or interpretation.

Example 2

Synthetic Aperture Radar Image Acquisition

Figure 5:
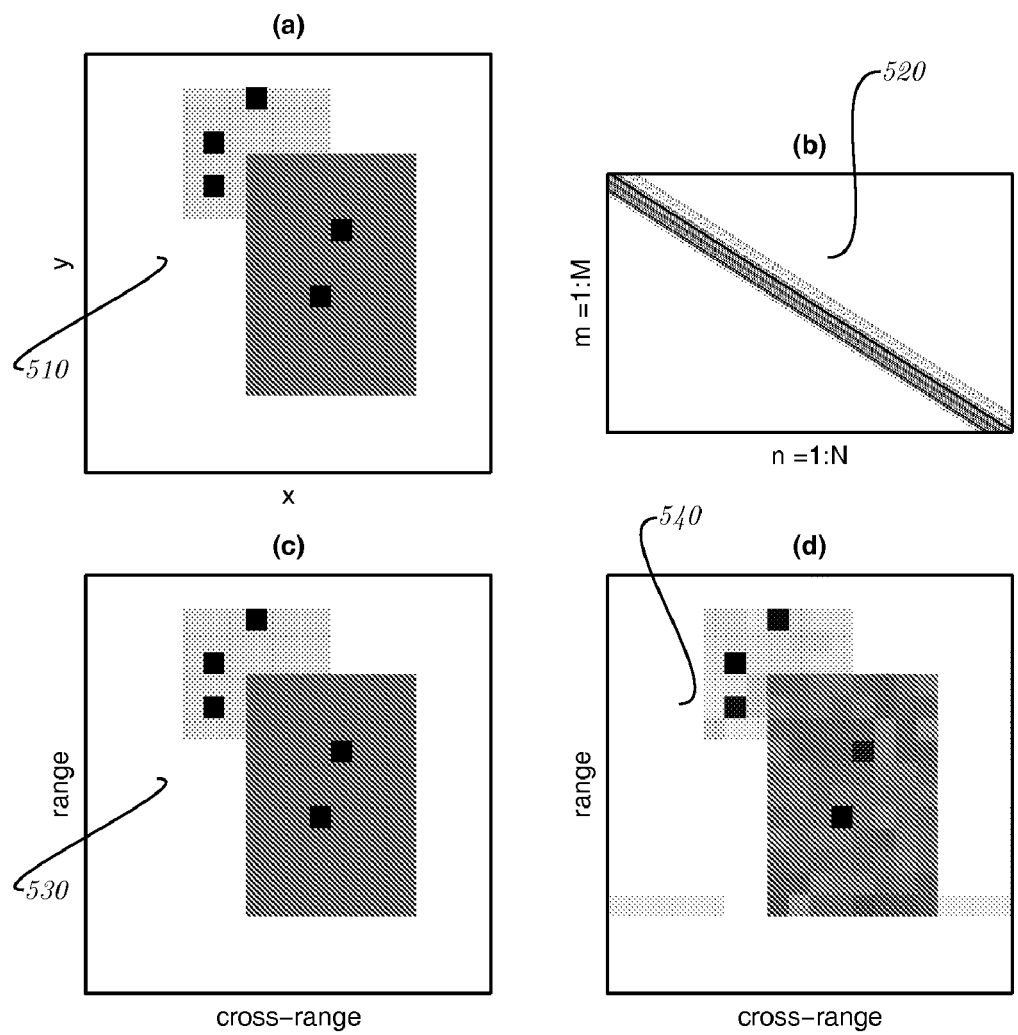
FIG. 5 is a diagram showing the result of a simulation of a synthetic aperture radar scene acquisition with the compressive sensing radar system.

FIG. 5a shows a 2-D radar reflectivity profile 510 that we for our simple simulation of a Synthetic Aperture Radar (SAR) scene acquisition. The SAR data acquisition was simulated using a forward model for the SAR imaging process, that is described in M. Cetin, "Feature-Enhanced Synthetic Aperture Radar Imaging", PhD Thesis, Boston University, College of Engineering, 2001. FIG. 5b shows the measurement matrix Φ 520 consisting of M=N/2 rows with the transmitted PN wave sequence. The Compressive Sensing recovery of the SAR scene 530 with two times undersampling is exact. An OMP algorithm using a combination of a time-sparse (identity) and Haar wavelet basis as the sparsity basis Ψ was used for the recovery of the SAR scene. The traditional SAR image 540 of FIG. 5d shows artifacts of the limited aperture of the imaging operator, which are absent in the image that was obtained with Compressive Sensing techniques. The result shown here is similar to what is obtained with the method of feature-enhance imaging (see M. Cetin, "Feature-Enhanced Synthetic Aperture Radar Imaging", PhD Thesis, Boston University, College of Engineering, 2001). However, the method of our invention has some added advantages, such as the large number of possible sparse representation of the radar reflectivity as well as more efficient signal recovery algorithms.

A preferred embodiment is to recover an N pixel radar scene from M<N measurements. Additional embodiments using more measurements are possible. For example, if we use M=N or M>M measurements than the extra measurements can then be used for subsequent processing. For example, additional measurements may be used for averaging or filtering when the received signal is noisy or corrupted in some way.

While the embodiment of the present invention described above relates to radar systems and methods and employs radio waves, those with skill in the art will understand that the present invention similarly applies to other environments and other wave echo profiling methods. The invention may also be applied to an underwater sonar system, employing sound waves. A system employing sound waves may take the form illustrated in FIG. 2 with the receiver and transmitting devices being devices for the reception and transmission of sound. In this utilization of the invention a sound wave reflectivity profile or scene is recovered from a received sound wave sequence.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. For example the conceptual block diagram of FIG. 2 is intended to to only convey the fundamental elements of a radar system in which the teachings of the present invention might be implemented. Those skilled in the art will appreciate that the present invention is readily applicable to any radar system configuration. It is intended that the scope of the invention be defined by the claims appended hereto, and their equivalents. The entirety of each of the aforementioned documents is incorporated by reference herein.

What is claimed is:

1. A radar transceiver comprising:
a received signal processor that utilizes knowledge of an outgoing wave sequence in combination with a compressible or sparse representation of a radar scene to recover a radar reflectivity profile by sampling a random filtered received signal to obtain samples containing sufficient information to reconstruct a sparse representation of said radar reflectivity profile.

2. A radar transceiver according to claim 1 wherein said received signal processor recovers said radar reflectivity profile from samples said received signal at a sampling rate below a Nyquist-rate of said radar reflectivity profile.

3. A radar transceiver according to claim 2 wherein a part of the radar reflectivity profile is reconstructed using a subset of coefficients associated with a full recovery of the radar reflectivity profile.

4. A radar transceiver according to claim 2 wherein the received signal processor performs a detection or Automatic Target Recognition task on the received wave sequence utilizing a compressible or sparse representation of the radar reflectivity profile in combination with knowledge of the outgoing wave sequence.

5. A radar transceiver according to claim 2 wherein the signal processor recovers a range-Doppler radar profile, utilizing a compressible or sparse representation of the radar profile in combination with knowledge of the outgoing wave sequence, and additional radar acquisition parameters, such as relative radar position, radar look direction, and Pulse Repetition frequency.

6. A radar transceiver according to claim 2 wherein the signal processor recovers a two-dimensional Synthetic Aperture Radar (SAR) scene, utilizing a compressible or sparse representation of the radar scene in combination with knowledge of the outgoing wave sequence and additional SAR acquisition parameters, such as relative radar position, radar look direction and Pulse Repetition Frequency.

7. A radar transceiver according to claim 2 wherein the signal processor recovers a two-dimensional Inverse Synthetic Aperture Radar (ISAR) target reflectivity profile, utilizing a compressible or sparse representation of the radar target, in combination with knowledge about the outgoing wave sequence and additional ISAR acquisition parameters, such as target position, radar look direction and Pulse Repetition Frequency.

8. A radar transceiver according to claim 2 wherein where the radar reflectivity profile or scene is developed in three dimensions.

9. A method for recovering a radar reflectivity profile comprising the steps of:
generating an outgoing wave sequence; and
recovering a radar reflectivity profile utilizing knowledge of said outgoing wave sequence in combination with a compressible representation of the reflectivity profile by sampling a random filtered received signal to obtain samples containing sufficient information to reconstruct a sparse representation of said radar reflectivity profile.

10. A method according to claim 9 wherein said received signal processor recovers said radar reflectivity profile from below a Nyquist-rate sampled received wave sequence.

11. A method according to claim 10 wherein part of the radar reflectivity profile is reconstructed using a subset of the coefficients associated with a full recovery of the radar reflectivity profile.

12. A method according to claim 10, further comprising the step of performing a detection or Automatic Target Recognition task on the received wave sequence utilizing a compressible representation of the radar reflectivity profile in combination with knowledge of the outgoing wave sequence.

13. A method according to claim 10, wherein said step of recovering a radar reflectivity profile comprises the step of recovering a range-Doppler radar profile, utilizing a compressible representation of the radar profile in combination with knowledge of the outgoing wave sequence, and additional radar acquisition parameters.

14. A method according to claim 13, wherein said additional radar parameters comprise at least one of relative radar position, radar look direction, and Pulse Repetition frequency.

15. A method according to claim 10, wherein said recovering step recovers a two-dimensional Synthetic Aperture Radar (SAR) scene, utilizing a compressible representation of the radar scene in combination with knowledge of the outgoing wave sequence and additional SAR acquisition parameters, such as relative radar position, radar look direction and Pulse Repetition Frequency.

16. A method according to claim 10, wherein the signal processor recovers a two-dimensional Inverse Synthetic Aperture Radar (ISAR) target reflectivity profile, utilizing a compressible or sparse representation of the radar target, in combination with knowledge about the outgoing wave sequence and additional ISAR acquisition parameters, such as target position, radar look direction and Pulse Repetition Frequency.

17. A method according to claim 10 wherein the radar reflectivity profile is developed in three dimensions.

18. A method according to claim 10, wherein said recovering step further comprises reconstructing a sparse representation of said radar reflectivity profile using Orthogonal Matching Pursuit.

* * * * *